(12) United States Patent
Zhang

(10) Patent No.: US 6,694,144 B1
(45) Date of Patent: Feb. 17, 2004

(54) METHOD AND SYSTEM FOR PROVIDING RELIABLE PAGING DELIVERIES IN A WIRELESS COMMUNICATION NETWORK

(75) Inventor: Chang-Gang Zhang, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 410 days.

(21) Appl. No.: 09/651,220

(22) Filed: Aug. 30, 2000

(51) Int. Cl.[7] .............................. H04Q 7/20; H04H 1/00
(52) U.S. Cl. .................. 455/458; 455/522; 455/69; 455/567; 370/339; 370/342
(58) Field of Search ................................ 455/458, 422, 455/116, 127, 560, 69, 522, 567, 512; 370/339, 335, 341, 342, 431, 441

(56) References Cited

U.S. PATENT DOCUMENTS

| | | | | |
|---|---|---|---|---|
| 5,402,467 A | * | 3/1995 | Watanabe ................... 455/412 |
| 5,594,776 A | * | 1/1997 | Dent .......................... 455/458 |
| 5,930,706 A | * | 7/1999 | Raith ....................... 455/422.1 |
| 6,138,034 A | * | 10/2000 | Willey ....................... 455/522 |
| 6,542,752 B1 | * | 4/2003 | Illidge ........................ 455/458 |
| 6,546,255 B1 | * | 4/2003 | Cerwall et al. ............. 455/449 |

* cited by examiner

Primary Examiner—William Trost
Assistant Examiner—Sharad Rampuria
(74) Attorney, Agent, or Firm—John D. Crane; Bracewell & Patterson, L. L. P.

(57) ABSTRACT

An improved method and system for providing reliable paging deliveries in a wireless communication network is disclosed. The mobile telephone communication network includes a mobile switching center (MSC), a base station controller (BSC), and a base transceiver station (BTS). Initially, each page messages is categorized under a respective message class accordingly. In response to a page message received from the BSC, a specific gain is assigned to the BTS for transmitting the received page message according to a respective message class to which the received page message belongs.

16 Claims, 2 Drawing Sheets

METHOD AND SYSTEM FOR PROVIDING RELIABLE PAGING DELIVERIES IN A WIRELESS COMMUNICATION NETWORK

BACKGROUND OF THE INVENTION

1. Technical Field

The present invention relates to a method and system for servicing a wireless communication network in general, and in particular to a method and system for servicing a mobile telephone communication network. Still more particularly, the present invention relates to a method and system for providing reliable paging deliveries in a mobile telephone communication network.

2. Description of the Prior Art

Today, wireless telecommunications represent a large and continuously increasing percentage of all new telephone subscriptions around the world. A typical cellular mobile telecommunication system includes multiple geographic regions known as cells. Each cell contains at least one base transceiver station (BTS). A BTS communicates directly with a mobile station (or mobile telephone) located in a corresponding cell. Several cells are grouped within a location area that contains one or more mobile switching centers (MSCs), and each of the MSCs is typically connected to several BTSs within the location area. The primary function of an MSC is to execute the switching requirements necessary to properly route calls between a mobile station located in one cell and a mobile station located in another cell. In addition, an MSC may be connected to a public switching telephone network (PSTN) such that the MSC can also facilitate the routing of calls between a mobile station and a fixed telephone terminal connected to the PSTN.

General speaking, a paging channel (P-channel), an access channel (A-channel), and a speech channel (S-channel) are provided between a mobile station and a BTS for the purpose of communication. A P-channel is used for establishing a connection when a call is originated in a mobile communication network, or a mobile station receives a call. A P-channel is also used for broadcasting system information to mobile stations. An A-channel is used for establishing connection when a call is originated in a mobile station and the call is terminated to the mobile station. After the connection has been established, the channel is switched from the P-channel and the A-channel to an S-channel for speech. When no communication is being carried out, the mobile station is in a standby state and receives a P-channel that is being broadcasted by a BTS.

In current wireless communications networks, especially in code-division multiplex access (CDMA) networks, call originations, call terminations, and other messaging services for idle subscribers are delivered via P-channels. The present disclosure provides an improved method and system for providing reliable paging deliveries.

SUMMARY OF THE INVENTION

With the code-division multiplex access (CDMA) technology, system capacity is typically forward-link limited. As a result, configuration of P-channels requires a tradeoff between system capacity and the successful rate of paging delivery. The successful rate of paging delivery can be increased by the allocation of a higher forward-link power for P-channels. But this causes another dilemma. On one hand, the allocation of higher forward-link power for P-channels reduces voice capacity, but on the other hand, in order to increase voice capacity, the P-channel power allocation has to be reduced, which would increase the failure rate of paging delivery. For most wireless communications networks, the failure rate of paging delivery and other message delivery have become an increasing concern because a high paging delivery failure rate will lead to a higher access failure rate.

In accordance with a preferred embodiment of the present invention, a mobile telephone communication network includes a mobile switching center (MSC), a base station controller (BSC), and a base transceiver station (BTS). Initially, each page messages is categorized under a respective message class accordingly. In response to a page message received from the BSC, a specific gain is assigned to the BTS for transmitting the received page message according to a respective message class to which the received page message belongs.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
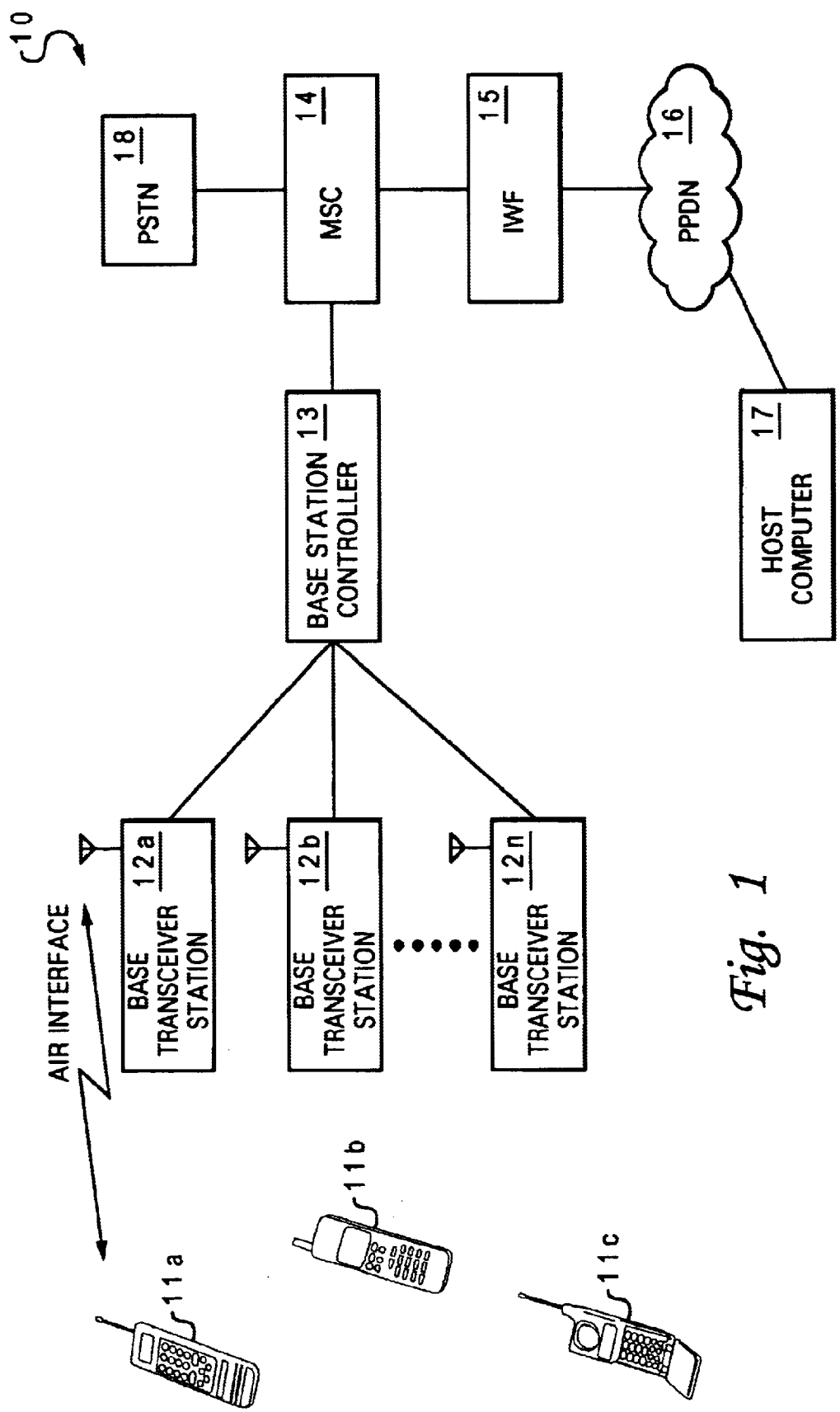
FIG. 1 is a pictorial diagram of a mobile telephone communication network in which a preferred embodiment of the present invention is implemented.

The present invention is applicable in all digital protocol-based mobile telephone communications systems having a non-transparent data link. Referring now to the drawings and in particular to FIG. 1, there is depicted a pictorial diagram of a mobile telephone communication network 10 in which a preferred embodiment of the present invention may be implemented. Communication network 10 utilizes a digital protocol such as code division multiple access (CDMA). As shown, communication network 10 includes several base transceiver stations (BTS) 12a–12n located at various locations within communication network 10. Each of BTSs 12a–12n is controlled by a base station controller (BSC) 13.

Coupled to BSC 13 is a mobile switching center (MSC) 14 for supporting CDMA and connectivity to a public switched telephone network (PSTN) 18. In addition, MSC 14 also supports various call processing functions. MSC 14 is coupled to a network Interworking Function (IWF) 15 via an L-Interface. IWF 15 is coupled to a host computer system 17 via a public packet data network (PPDN) 16. Host computer system 17 may be, for example, a midrange computer having a processor (not shown), a main memory (not shown), and a storage device (not shown) as is well-known to those skilled in the art. Host computer system 17 communicates with PPDN 16 utilizing a standard procedure that is also well-known to those skilled in the art.

Within the service area of communication network 10, there are several mobile stations, such as mobile stations 11a, 11b, and 11c. The software for handling the exchange of data packets between one of mobile stations 11a–11c and one of BTSs 12a–12n within communication network 10 commonly resides within mobile stations 11a–11c and BSC 13.

Currently, paging channels (P-channels) are implemented with a fixed digital gain controlled by a BTS such as one of BTSs 12a–12n. A prior art page-channel is designed to have a fixed power that is data filled based on the estimation of site coverage. It is well known that site coverage in CDMA system is more often dynamically depended upon system load and interference level. Thus, high power allocation on P-channels is obviously not desired because it would cause a reduction in voice capacity. When a mobile station originates a call, the origination message is sent to the BTS at which the mobile station is logged on via an access channel (A-channel). After receiving call origination message, the BTS communicates with BSC 13 and MSC 14 to set up resources for call processing. When this is ready, the BTS sends channel assignment message to the mobile station via a P-channel to direct the mobile station to the traffic channel. In many cases, the call may be originated in areas with weak signal coverage, high interference, no dominant server, or at the system border, and as a result, access failures could occur due to critical P-channel messages being missed by the mobile station.

Figure 2:
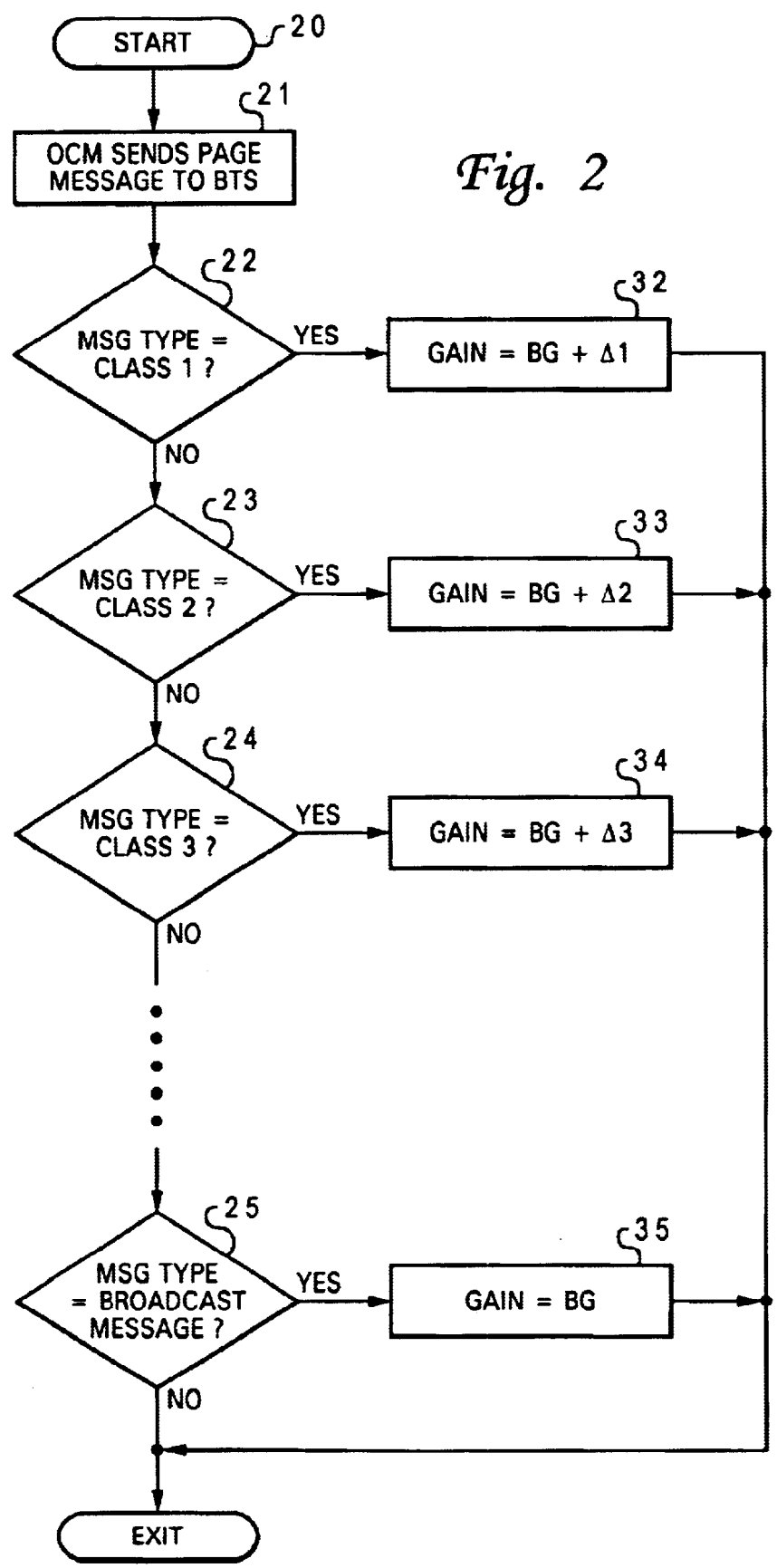
FIG. 2 is a high-level logic flow diagram of a method for providing reliable paging deliveries, in accordance with a preferred embodiment of the present invention.

With reference now to FIG. 2 there is depicted a high-level logic flow diagram of a method for providing reliable paging deliveries, in accordance with a preferred embodiment of the present invention. Starting at block 20, an overhead channel manager (OCM) located within BSC 13 sends a page message to a mobile station, as shown in block 21. All page messages have previously been assigned to one of many categories such as Class 1, Class 2, or Class 3. A determination is made as to whether or not the page message is a Class 1 message, as depicted in block 22. If the page message is a Class 1 message, a first gain is added to a base gain (BG) as a total assigned gain for a BTS to transmit this page message, as illustrated in block 32. The base gain is defined as the existing fixed gain for a P-channel to broadcast system parameters. Base gain is typically approximately 4% of total forward power (for example, 0.5 W or 27 dBm). The first gain is approximately 1 dB.

Otherwise, if the page message is not a Class 1 message, another determination is made as to whether or not the page message is a Class 2 message, as shown in block 23. If the page message is a Class 2 message, a second gain is added to the base gain as the total assigned gain for the BTS to transmit the page message, as depicted in block 33. The second gain is approximately 0.75 dB. Otherwise, if the page message is not a Class 2 message, another determination is made as to whether or not the page message is a Class 3 message, as shown in block 24. If the page message is a Class 3 message, a third gain is added to the base gain as the total assigned gain for the BTS to transmit the page message, as depicted in block 34. The third gain is approximately 0.5 dB. This iteration continues until the page message has been checked against different message classes. If the page message does not match against other message classes, the base gain is set as the total assigned gain for the BTS to transmit the page message, as depicted in block 35.

There are many ways page messages can be categorized under different message classes. For example, each type of page messages can be categorized as a message class, but certainly several groups of page messages can be grouped as one page class, depending on their respective priorities. The following is an example of different page messages categorization:

Class 1: channel assignment messages, extended channel assignment messages;

Class 2: short message services, authentication challenge messages; and

Class 3: status request messages, order messages, message waiting indication, data burst messages, feature notification messages, base station ack order messages.

In accordance with a preferred embodiment of the present invention, an improved paging delivery system implemented in communication network 12 includes:

1) a detection mechanism located at a BTS or a BSC for detecting critical paging message delivery such as call termination, channel assignment message, etc.;

2) an intelligent power control mechanism located at a BTS for allocating a desired amount of energy (in dB increment) in addition to the standard base gain for data filled P-channel power when needed;

3) a triggering mechanism located at a BTS for triggering energy boost in P-channel in short period of time accompanying the delivery of paging message; and 4) a control mechanism located at a BTS for determining enabling/disabling energy boost, or enabling/disabling energy boost only second page, or enabling/disabling energy boost only for zone paging.

As has been described, the present invention provides an improved method and system for providing reliable paging deliveries. The method of the present invention equips the BTS (or the BSC) with the ability to boost energy beyond its data filled power allocation by a precisely desired amount when transmitting a critical paging message. With this capability, the likelihood for a mobile station to successfully receive the paging message is greatly improved. The energy burst would not necessary to cost interference increase in the case of call origination because only one BTS is involved. In the case of call termination, the situation would be quite different. The system does not know where the mobile station is, the page is sent to the entire system. The page is used to locate the mobile station. It is not recommended to use the present invention when delivering such paging message, otherwise, system wide energy boost when transmitting such paging can cause excess interference. However, the scheme can be enabled with zone-based paging. This way, the mobile station has better chance to receive pages due to the energy boost on the one hand, the extra energy is limited within the zone on the other hand. Once the mobile station has been successfully located, the BTS has to send channel assignment messages to the mobile station via a P-channel as it is in the case of call origination. Energy boost has to be activated at this point of time to ensure delivery of such a critical message.

It is important to note that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing reliable paging deliveries within a mobile telephone communication network, wherein said mobile telephone communication network includes a mobile switching center (MSC), a base station controller (BSC), and a base transceiver station (BTS), said method comprising the steps of:

categorizing each of a plurality of page messages in a respective message class accordingly;

in response to a page message received from a BSC, assigning a specific gain for transmitting said received page message according to a respective message class to which said received page message belongs.

2. The method according to claim 1, wherein said message class includes a Class 1, a Class 2, and a Class 3.

3. The method according to claim 2, wherein an assigned gain for Class 1 page messages is a base gain plus 1 dB.

4. The method according to claim 2, wherein an assigned gain for Class 2 page messages is a base gain plus 0.75 dB.

5. The method according to claim 2, wherein an assigned gain for Class 3 page messages is a base gain plus 0.5 dB.

6. A mobile telephone communication network, wherein said mobile telephone communication network includes a mobile switching center (MSC), a base station controller (BSC), and a base transceiver station (BTS), said mobile telephone communication network comprising:

means for categorizing each of a plurality of page messages in a respective message class accordingly;

in response to a page message received from said BSC, means for assigning a specific gain for transmitting said received page message according to a respective message class to which said received page message belongs.

7. The mobile telephone communication network according to claim 6, wherein said message class includes a Class 1, a Class 2, and a Class 3.

8. The mobile telephone communication network according to claim 7, wherein an assigned gain for Class 1 page messages is a base gain plus 1 dB.

9. The mobile telephone communication network according to claim 7, an assigned gain for Class 2 page messages is a base gain plus 0.75 dB.

10. The mobile telephone communication network according to claim 7, wherein an assigned gain for Class 3 page messages is a base gain plus 0.5 dB.

11. A method for providing reliable paging deliveries within a mobile telephone communication network, said method comprising:

categorizing each of a plurality of page messages in a respective message class accordingly;

after receiving a page message, assigning a specific gain for transmitting said received page message according to a respective message class to which said received page message belongs.

12. The method according to claim 11, wherein said message class includes a Class 1, a Class 2, and a Class 3.

13. The method according to claim 12, wherein an assigned gain for Class 1 page messages is a base gain plus 1 dB.

14. The method according to claim 12, wherein an assigned gain for Class 2 page messages is a base gain plus 0.75 dB.

15. The method according to claim 12, wherein an assigned gain for Class 3 page messages is a base gain plus 0.5 dB.

16. The method according to claim 11, wherein said received page message is from a base transceiver station within said mobile telephone communication network.

* * * * *